UNITED STATES PATENT OFFICE.

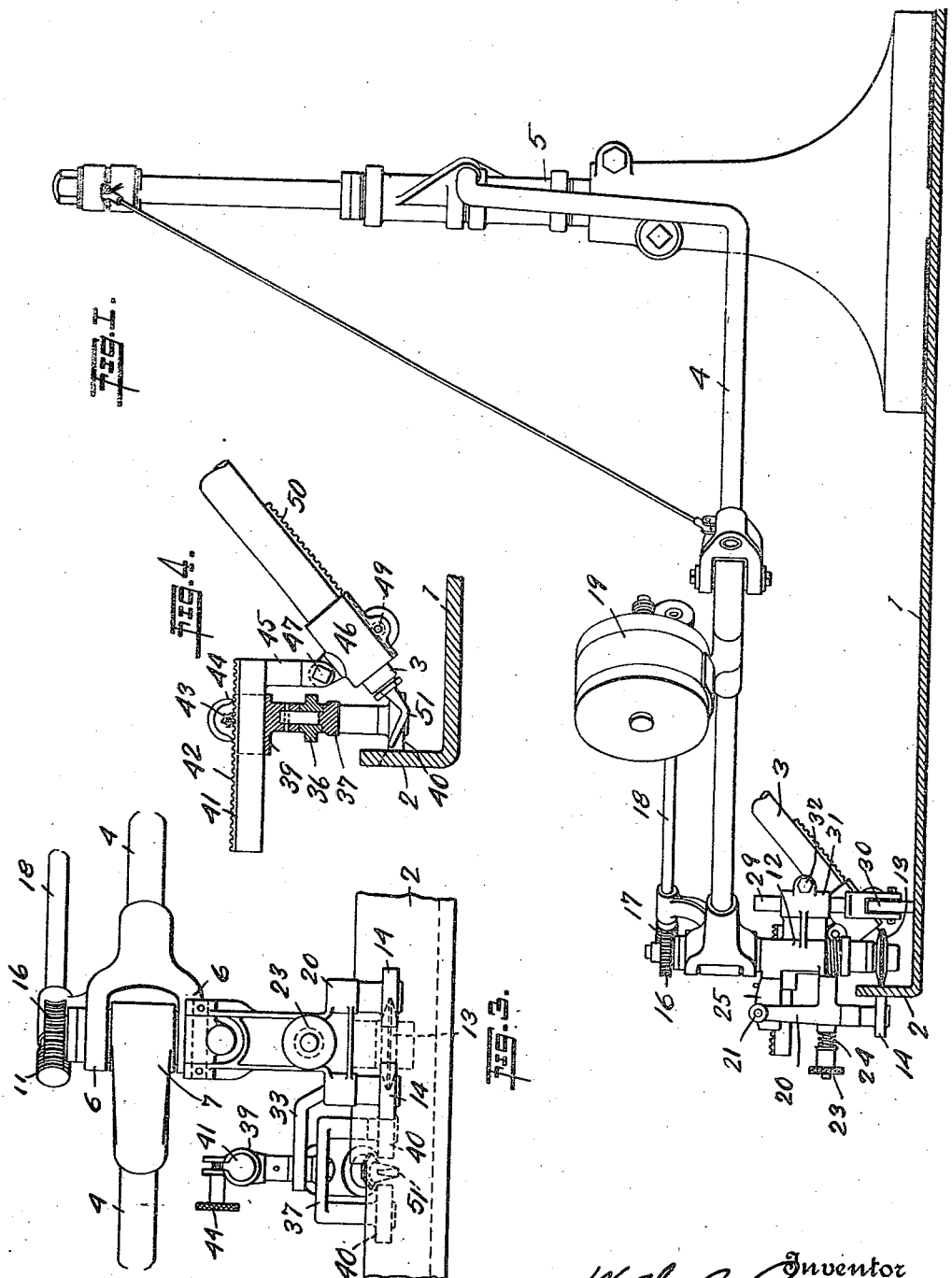

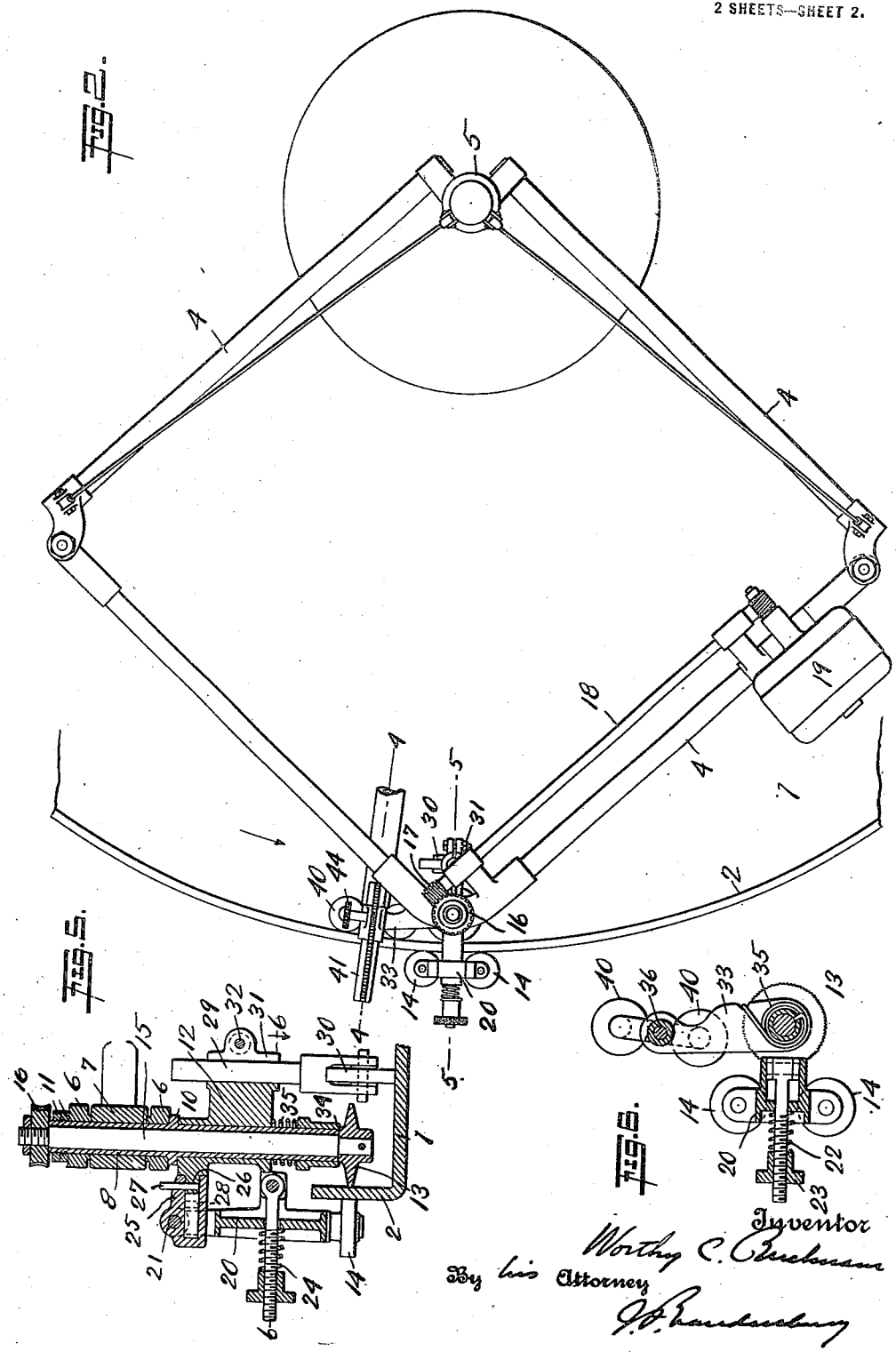

WORTHY C. BUCKNAM, OF JERSEY CITY, NEW JERSEY, ASSIGNOR TO DAVIS-BOURNONVILLE COMPANY, OF JERSEY CITY, NEW JERSEY, A CORPORATION OF NEW YORK.

APPARATUS FOR TRIMMING FLANGES.

1,172,933.  Specification of Letters Patent.  Patented Feb. 22, 1916.

Application filed October 29, 1915. Serial No. 58,586.

*To all whom it may concern:*

Be it known that I, WORTHY C. BUCKNAM, a citizen of the United States, and a resident of Marion, Jersey City, in the county of Hudson and State of New Jersey, have invented certain new and useful Improvements in Apparatus for Trimming Flanges, of which the following is a specification.

The object of the invention is to provide means for expeditiously and economically trimming the flanges of boiler heads. In such heads as formed the flanges are uneven and wider than is desired, and accordingly have to be trimmed off to the proper uniform width, which heretofore has been a lengthy and laborious matter.

The present apparatus comprises a mechanically propelled wheeled carriage adapted to travel along the upstanding flange of a boiler head placed horizontally, and jet-cutting means transported by the carriage and directed laterally against the flange on which the carriage is guided so as to cut the same to the desired width.

In the accompanying drawings illustrating a preferred embodiment of the invention: Figure 1 is a side elevation of the apparatus in operative relation to a boiler head, shown in section; Fig. 2 is a plan view; Fig. 3 is an elevation, looking at the outside of the flange and showing the cut in progress; Fig. 4 is a vertical section on the line 4—4 of Fig. 2; Fig. 5 is a vertical section on the line 5—5 of Fig. 2; and Fig. 6 is a horizontal section on the line 6—6 of Fig. 5.

The views show a portion of a boiler head 1 with its flange 2. For the trimming operation the head is placed flat upon any convenient support, with its flange projecting upward.

A wheeled carriage for transporting the jet-cutting device 3 along the flange is preferably, though not necessarily, secured upon the end of a jointed arm or arms 4 mounted pivotally on a stationary support, such as the pedestal 5, which may stand upon the central portion of the head or be otherwise sustained.

In the particular construction illustrated the ends of the jointed arms are formed with vertical eyes or hubs 6 and 7 for the reception of a bushing 8, which is held against vertical displacement by a shoulder 10 and nuts 11.

The body 12 of the carriage is supported pivotally on the outside of the said bushing beneath the shoulder 10, and the carriage is provided with horizontal wheels 13 and 14, which are arranged to embrace the flange as shown. One wheel 13, which in this instance is the driving wheel, is fast on the lower end of a vertical shaft 15, which extends all the way through the bushing 8 and bears at its upper end a worm wheel 16, the said worm wheel being meshed by a worm 17 on a shaft 18 mounted on one of the jointed arms and driven by an electric motor 19 also supported on said arm. The other wheels 14, of which there are preferably two, equidistant from the wheel 13, are disposed at the opposite side of the flange and are mounted so as to be spring urged toward the driving wheel. To this end a depending wheel support 20 is fulcrumed at 21 so as to be capable of tilting about a horizontal axis, and is controlled by a swing bolt 22 and a nut 23, the latter acting upon the wheel support through a compression spring 24. The fulcrum pivot 21 may connect said depending wheel support with a part 25, which can be set on an arm 26 projecting laterally from the body of the carriage, at any one of two or more points depending upon the position of a pin 27 which is adapted to pass through holes in the parts 25 and 26, an unoccupied hole being indicated at 28. This provision for adjustment of the fulcrum is desirable, because it enables the wheels 14 to be pressed against the flange substantially horizontally, whether the flange is thin or thick.

The height of the carriage and of the wheels 13 and 14 is determined by a post 29 having a wheel 30 at its lower end to roll upon the face of the boiler head. The said post is clamped in a split sleeve 31 on the body of the carriage and may be adjusted longitudinally therein, so as to raise and lower the carriage, by loosening the screw 32, slipping the post one way or the other and again tightening the screw. This wheel and post constitute a support for the carriage and a gage to maintain the line of the cut straight and at a definite height upon the flange.

The cutting device is preferably mounted upon a secondary carriage or trailer, which is pivoted on a vertical axis on the mechanically propelled carriage and spring-pressed against the side of the flange. Such secondary carriage preferably comprises an arm 33 having a hub 34 rotatably mounted on the lower end of the bushing 8 and acted upon by a coil spring 35, one end of which bears against the bushing while the other end bears against the arm, as shown in Fig. 6. At its free end the arm 33 has a bearing for a vertical swivel 36 which is united below the arm with a double wheel support 37 and above it with a member 38 having a horizontal split sleeve 39. The lower ends of the said wheel support carry horizontal flange-bearing wheels 40, equidistant from the axis of the swivel.

In the sleeve 39 a bar 41 having rack teeth 42 is adjustable lengthwise, across the flange, by means of a pinion 43 meshing with said rack teeth and rotatable by means of a hand wheel 44. An arm 45 projects downward from the inner end of this bar, and to it a tubular holder 46 is pivoted so that the said holder may be tilted in a vertical plane and set at the desired angle by tightening the nut or screw 47. In the said holder there is placed a jet-cutting device 3, of known character, which may be shifted up or down in the holder by means of a pinion 49 engaging rack teeth 50 on the body of the torch. The nozzle 51 of this device is preferably bent at an upward inclination, and its height relatively to the carriage, its distance from the flange, and its angularity in a vertical sense may all be adjusted by the means indicated. It will be noted that it is disposed centrally with respect to the two wheels 40, and that the whole arrangement is such that the angle of the nozzle to the flange, in a horizontal sense, is preserved uniform throughout the cut.

The operation will be readily understood from the foregoing description.

The apparatus having been set up as shown in the views and the jets having been turned on, the motor is started, thereby rotating the flange-engaging wheel 13 and thus propelling the carriage and with it the jet-cutting device at uniform speed along the flange. The cutting gases are directed upon the side of the flange, the upper portion of which is thereby cut off above the wheels as the structure travels. The jets throughout the cut are spaced at a uniform distance from the face of the boiler head or the like by means of the wheel 30, which travels thereon. The specific height at which the flange is cut off may be determined by raising and lowering the sleeve 31 of the carriage 12 on the post 29 of this wheel, and also by adjusting the torch relatively to the carriage in the manner heretofore described. The construction of the carriage with its pivoted or swinging torch-bearing portion 33 having the swiveled wheel carrier 37, and the relation of the torch to the wheels 40, are such that the angular relation of the jets to the flange is maintained throughout the travel, and thus a uniform cutting action is insured.

It may be noted that the upward inclination of the nozzle at the inner side of the flange is desirable, in that it produces a beveled edge, with the greatest height on the outer side, which is important for calking.

While I have described the preferred embodiment of the invention in detail, it is to be understood that I do not limit myself to the precise construction shown and that numerous changes may be made without departing from the spirit of the invention.

Furthermore, while the device is primarily designed for trimming the flanges of boiler heads, it will be apparent that it may also be used for other similar work.

What I claim as new is:

1. An apparatus for trimming the flanges of boiler heads or the like, comprising a mechanically propelled carriage having means for guiding it upon and along an upstanding flange at a uniform distance above the face of the head or similar body, and transversely directed jet-cutting means transported by said carriage so as to remove the upper portion of the flange at the desired height.

2. An apparatus of the character described, comprising a mechanically propelled carriage having horizontal wheels arranged to embrace the upstanding flange of a boiler head or the like and one or more wheels arranged to run on the face of the head to cause the horizontal wheels to travel at a constant height, and means transported by the carriage for delivering cutting gases laterally against the flange on which the carriage is guided.

3. An apparatus for trimming the flanges of boiler heads and the like, comprising a mechanically propelled carriage having wheels adapted to embrace an upstanding flange, a secondary carriage pivoted upon a vertical axis on the mechanically propelled carriage and having wheels adapted to travel upon one side of the flange, a spring for holding the secondary carriage with its wheels against the flange, and jet-cutting means on the secondary carriage adapted to operate upon the flange at a predetermined height.

4. An apparatus for trimming the flanges of boiler heads and the like, comprising a mechanically propelled carriage having means for guiding it upon an upstanding flange, an arm pivoted upon a vertical axis on the mechanically propelled carriage, a member swiveled upon a vertical axis on said arm and having wheels spaced equidistant from the swivel axis to travel on the flange, and a cutting torch mounted on said swiveled member with its nozzle opposed to the flange and disposed centrally with respect to said spaced wheels.

5. An apparatus for trimming the flanges of boiler heads or the like, comprising a mechanically propelled carriage constructed to travel along an upstanding flange at a uniform distance above the face of the head or similar body, transversely directed jet-cutting means transported by said carriage, and means for shifting said jet-cutting means vertically so as to deliver the gases at the desired height against the flange.

6. An apparatus for trimming the flanges of boiler heads and the like, comprising, in combination, a carriage having horizontal wheels adapted to embrace an upstanding flange, a cutting nozzle transported by the carriage and directed laterally against the said flange, means for adjusting the height at which said carriage and its horizontal wheels travel, and means for adjusting the said nozzle up and down transversely to itself and relatively to the carriage.

7. An apparatus for trimming the flanges of boiler heads or the like, comprising, in combination, a carriage having horizontal wheels adapted to embrace an upstanding flange, driving means geared to one of said horizontal wheels, means of additional rolling support to travel upon the face of the head or similar body, and a cutting nozzle transported by the carriage and directed laterally against the said flange.

8. An apparatus for trimming the flanges of boiler heads and the like, comprising a stationary support, a jointed arm pivotally mounted thereon, a wheeled structure on the end of the said arm having wheels adapted to embrace the flange to be trimmed, means for driving the said wheeled structure along the flange, and a jet-cutting device transported by said wheeled structure and mounted to deliver its gases against the side of the flange.

WORTHY C. BUCKNAM.